United States Patent
Sgouromitis et al.

(10) Patent No.: US 12,546,232 B1
(45) Date of Patent: Feb. 10, 2026

(54) INDUCING WINDMILLING TO ALLOW OIL FLOW DURING FIRE-INDUCED EMERGENCY STATE

(71) Applicant: PRATT & WHITNEY CANADA CORP., Longueuil (CA)

(72) Inventors: John Sgouromitis, Dorval (CA); Richard Brandt, Saint Lambert (CA); Mark Feeney, Candiac (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/093,452

(22) Filed: Mar. 28, 2025

(51) Int. Cl.
| | |
|---|---|
| F01D 21/14 | (2006.01) |
| F02C 7/042 | (2006.01) |
| F02C 7/057 | (2006.01) |
| F02C 7/06 | (2006.01) |
| F02C 7/25 | (2006.01) |
| B64D 45/00 | (2006.01) |

(52) U.S. Cl.
CPC ............ *F01D 21/14* (2013.01); *F02C 7/042* (2013.01); *F02C 7/057* (2013.01); *F02C 7/06* (2013.01); *F02C 7/25* (2013.01); *B64D 2045/009* (2013.01); *F05D 2220/323* (2013.01); *F05D 2270/09* (2013.01)

(58) Field of Classification Search
CPC ... B64D 2045/009; F01D 21/00; F01D 21/14; F02C 7/042; F02C 7/052; F02C 7/057; F02C 7/25
See application file for complete search history.

(56) References Cited

U.S. PATENT DOCUMENTS

| | | | |
|---|---|---|---|
| 5,284,012 A * | 2/1994 | Laborie | F02C 7/12 60/39.08 |
| 5,351,476 A | 10/1994 | Laborie et al. | |
| 8,991,191 B2 | 3/2015 | Diaz et al. | |
| 10,513,949 B2 | 12/2019 | Parnin et al. | |
| 11,125,111 B2 | 9/2021 | Mason et al. | |
| 11,421,554 B2 | 8/2022 | Davies | |
| 11,702,990 B2 | 7/2023 | Smith | |
| 11,873,890 B2 | 1/2024 | Gaully et al. | |
| 2014/0069744 A1 | 3/2014 | Scipio et al. | |
| 2023/0313739 A1 | 10/2023 | Becoulet et al. | |
| 2025/0223929 A1* | 7/2025 | Everaets | F02C 9/18 |

FOREIGN PATENT DOCUMENTS

CH 652453 A5 11/1985

* cited by examiner

*Primary Examiner* — Scott J Walthour
(74) *Attorney, Agent, or Firm* — NORTON ROSE FULBRIGHT CANADA LLP (57) ABSTRACT

A method is provided for operating an aircraft engine in a fire-induced emergency state. The engine is housed in a nacelle defining a nacelle bypass duct having a first outlet fluidly connected to an inlet of the engine and a second outlet fluidly connected to an environment external to the nacelle. An indication of a fire of the aircraft engine is received. In response to receiving the indication, an emergency shutdown sequence of the engine is initiated. In response to the initiating the emergency shutdown sequence, a volume of air entering the inlet of the aircraft engine is increased by restricting air flow through the second outlet of the nacelle bypass duct. The volume of air entering the inlet is used to drive a rotor of the engine. The rotor is used to drive an oil pump to circulate oil through a main oil conduit of the engine.

6 Claims, 9 Drawing Sheets

INDUCING WINDMILLING TO ALLOW OIL FLOW DURING FIRE-INDUCED EMERGENCY STATE

TECHNICAL FIELD

The disclosure relates generally to aircraft engines and, more particularly, to emergency shutdown procedures for aircraft engines.

BACKGROUND

Aircraft engines are provided with emergency shutdown procedures, for instance, in the case of a fire inside the engine case. In some engines, such shutdown procedures can utilize the occurrence of windmilling to continue driving various engine systems contributing to such procedures. However, in other engines, the airflow generated by windmilling may be insufficient to do so. Improvements are thus desired.

SUMMARY

In one aspect, there is provided a method for operating an aircraft engine in a fire-induced emergency state, the aircraft engine housed in a nacelle defining a nacelle bypass duct having a first outlet fluidly connected to an inlet of the aircraft engine and a second outlet fluidly connected to an environment external to the nacelle, the method comprising: receiving an indication of a fire of the aircraft engine; in response to the receiving the indication of the fire in the aircraft engine, initiating an emergency shutdown sequence of the aircraft engine; in response to the initiating the emergency shutdown sequence of the aircraft engine, increasing a volume of air entering the inlet of the aircraft engine by restricting air flow through the second outlet of the nacelle bypass duct; using the volume of air entering the inlet to drive a rotor of the aircraft engine; and using the rotor to drive an oil pump to circulate oil through a main oil conduit of the aircraft engine.

In certain embodiments, the method as defined above includes one or more of the following features, in whole or in part, and in any combination.

In an embodiment, the restricting air flow through the second outlet includes closing a closure in the nacelle bypass duct upstream of the second outlet, and the method further includes biasing, via an actuator, the closure from a first position in which the second outlet of the bypass duct is fluidly connected to an inlet of the bypass duct to a second position in which fluid flow from the inlet of the bypass duct to the second outlet of the bypass duct is at least partially blocked by the closure.

In an embodiment, the method further includes, subsequently to the biasing the closure from the first position to the second position, retaining, via a securing device, the closure in the second position.

In an embodiment, the biasing the closure from the first position to the second position includes activating a servo motor to rotate a locking cam, the locking cam biasing the closure from the first position to the second position.

In an embodiment, the biasing the closure from the first position to the second position includes sliding the closure in a direction tangential to the second outlet of the bypass duct from the first position to the second position.

In an embodiment, the increasing the volume of air entering the inlet of the aircraft engine is automatically initiated upon the initiating the emergency shutdown sequence of the aircraft engine.

In another aspect, there is provided an aircraft engine system, comprising: an aircraft engine including: a core gas path extending from an air inlet to an exhaust, a turbine disposed in the core gas path, and an oil system including an oil pump drivable by the turbine; and a nacelle disposed around the aircraft engine and defining a nacelle bypass duct having a bypass duct inlet, a first bypass duct outlet in fluid communication with the air inlet of the core gas path, and a second bypass duct outlet in fluid communication with an environment external to the nacelle, the nacelle bypass duct having a closure movable between a first position in which the second bypass duct outlet is fluidly connected to the bypass duct inlet and a second position in which fluid flow from the bypass duct inlet to the second bypass duct outlet is at least partially blocked by the closure.

In certain embodiments, the aircraft engine system as defined above includes one or more of the following features, in whole or in part, and in any combination.

In an embodiment, the aircraft engine system further includes actuator operatively coupled to the closure, the actuator operable to bias the closure from the first position to the second position.

In an embodiment, the aircraft engine system further includes a securing device for retaining the closure in the second position.

In an embodiment, the actuator includes a servo motor and a locking cam adapted to selectively retain the closure in the first position and to bias the closure from the first position to the second position.

In an embodiment, the securing device includes a spring latch adapted to retain the closure in the second position.

In an embodiment, the closure is hingedly mounted to a wall of the nacelle bypass duct and rotatable between the first position and the second position.

In an embodiment, the closure is slideable in a direction tangential to the bypass duct outlet from the first position to the second position.

According to a further aspect, there is provided a fire-induced shutdown system for an aircraft engine positioned within an aircraft nacelle, comprising: an oil system including an oil pump and an oil conduit flowing oil throughout components of the aircraft engine, the oil pump driven by a rotor of the aircraft engine; and an airflow control system modulating a flow of air through a nacelle bypass duct towards an air inlet of the aircraft engine, the airflow control system including a closure disposed at a bypass duct outlet of the nacelle bypass duct, the airflow control system adapted to bias the closure to at least partially seal the bypass duct outlet upon receipt of an indication of a fire-induced shutdown sequence of the aircraft engine and increase a flow rate of a bypass airflow entering the air inlet and driving the rotor.

In certain embodiments, the fire-induced shutdown system as defined above includes one or more of the following features, in whole or in part, and in any combination.

In an embodiment, the fire-induced shutdown system further includes an actuator operatively coupled to the closure, the actuator adapted to bias the closure to a closed position in which the bypass duct outlet is at least partially sealed.

In an embodiment, the fire-induced shutdown system further includes a securing device retaining the closure in the closed position.

In an embodiment, the actuator includes a servo motor and a locking cam adapted to selectively retain the closure in an position and to bias the closure from an open position to the closed position.

In an embodiment, the securing device includes a spring latch adapted to retain the closure in the closed position.

In an embodiment, the closure is hingedly mounted to a wall of the nacelle bypass duct and rotatable to a closed position in which the bypass duct outlet is at least partially sealed.

In an embodiment, the closure is slideable in a direction tangential to the bypass duct outlet to a closed position in which the bypass duct outlet is at least partially sealed.

DESCRIPTION OF THE DRAWINGS

Reference is now made to the accompanying figures in which.

DETAILED DESCRIPTION

Figure 1:
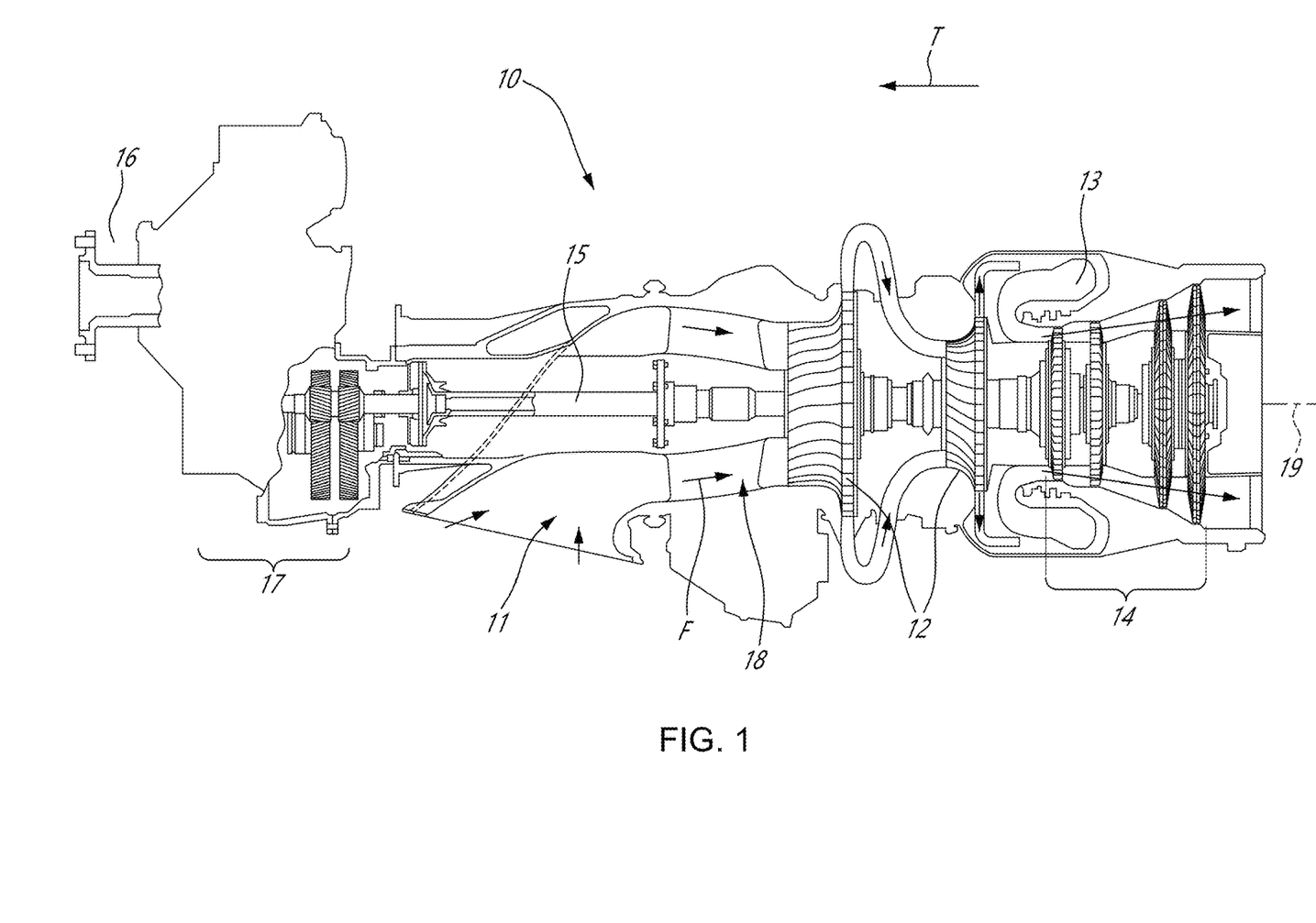
FIG. 1 is a schematic cross sectional view of a gas turbine engine.

FIG. 1 illustrates an example of a gas turbine engine. In this example, the gas turbine engine is a gas turboprop engine 10 of a type preferably provided for use in subsonic flights, generally comprising in serial flow communication an inlet 11 through which air is drawn to subsequently be compressed by compressors 12. Fuel is added to the compressed air in a combustor 13 for the combustion of the fuel and air mixture. Combustion gasses then expand to drive turbine 14. In the specific case of a turboprop engine, a power shaft 15 connected to one of the turbines 14 projects forwardly to transmit a driving force to a propeller shaft 16 via a reduction gearbox generally shown at 17. Other types of gas turbine engines can have corresponding arrangements.

It should be noted that the terms "upstream" and "downstream" used herein refer to the direction of an air/gas flow passing through an annular gaspath 18 of the gas turbine engine 10. It should also be noted that the term "axial", "radial", "angular" and "circumferential" are used with respect to a central axis 19 of the annular gaspath 18, which may also be a central axis of gas turbine engine 10. The gas turbine engine 10 is depicted as a through-flow engine in which the airflow F flows in the annular gaspath 18 from a front of the gas turbine engine 10 to a rear of the gas turbine engine 10, relative to a direction of travel T of the gas turbine engine 10. This is opposite than a reverse-flow engine in which the air flows within the gaspath in a same direction as the direction of travel T, from the rear of the engine towards the front of the gas turbine engine 10. The principles of the present disclosure can be applied to both reverse-flow and through-flow engines and to any other gas turbine engines, such as a turbofan engine and a turboprop engine. The principles of the present disclosure can also be applied to an auxiliary power unit (APU).

In the case of an emergency shutdown due to a fire hazard within the engine 10, the engine 10 is provided with procedures to improve the survivability of its hardware. Indeed, during a fire scenario, components such as oil tubes and fittings are exposed to an engulfing flame and are thus susceptible to damage, for instance leakage. In certain engines, for instance turbofan engines, if the aircraft is flying when the fire occurs, the fan may continue to rotate or windmill after the engine is shutdown. The rotating fan will continue to rotate the core engine rotors, which in turn will continue to drive the various engine accessories such as the oil pumps. The ongoing flow of oil throughout the engine components will act as a heat sink, spreading heat energy throughout the engine and limiting the risks of acute exposure. However, for other engine types such as turboprop or turboshaft engines, the airflow entering the inlet of the engine under windmilling conditions may be limited, preventing the core engine rotors from driving the oil pumps with sufficient velocity to flow oil throughout the engine components. As such, the present disclosure provides an airflow control system modulating a flow of air through a nacelle bypass duct towards an air inlet of the aircraft engine, thereby limiting the risks associated with the fire event.

Figure 2:
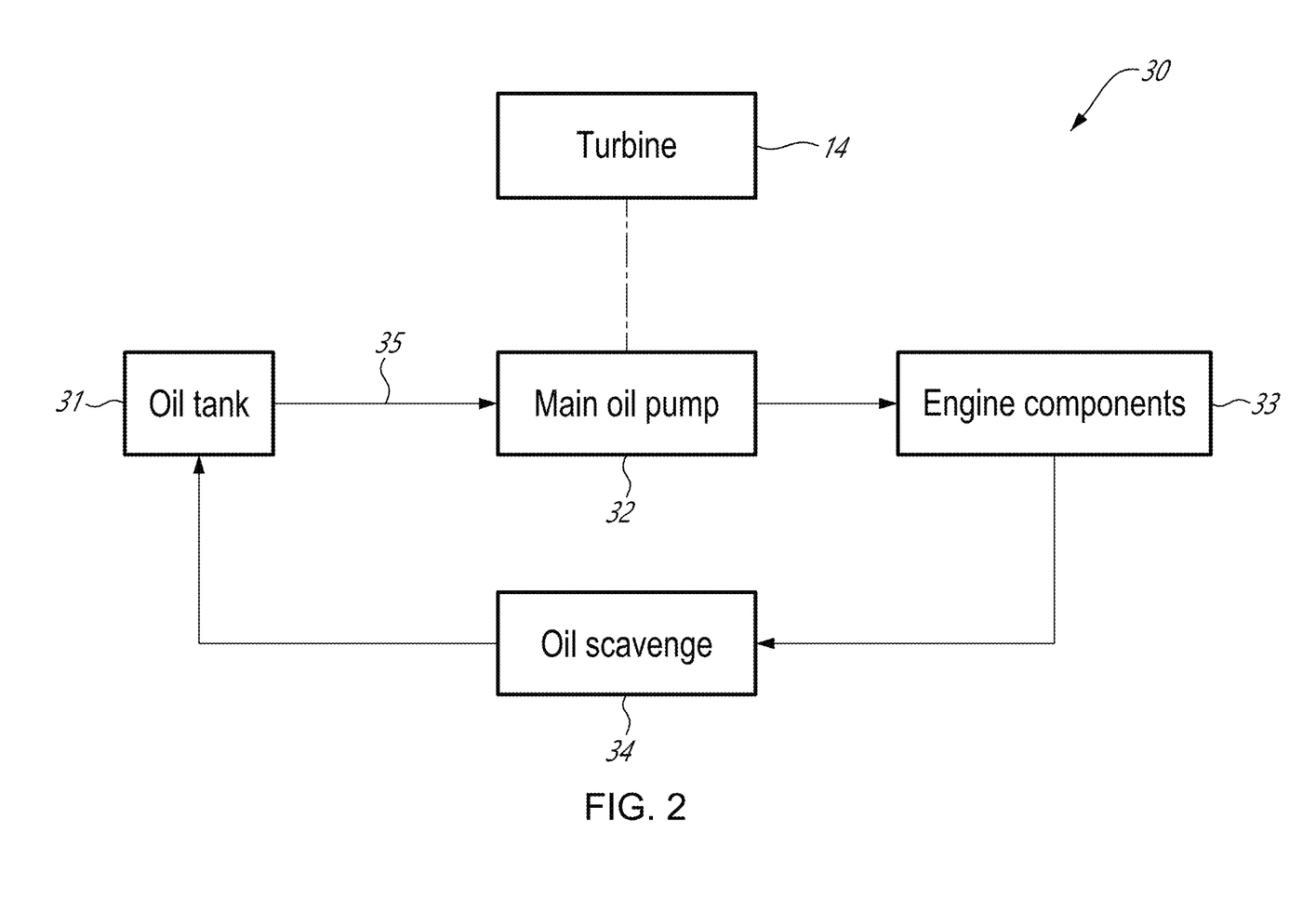
FIG. 2 is a schematic diagram of an exemplary oil system for the engine of FIG. 1.

Referring now to FIG. 2, an oil system 30 for the engine 10 is shown in accordance with some embodiments of the present disclosure. The oil system 30 includes an oil tank 31 (also referred to as an oil reservoir), a main oil pump 32, various engine component(s) 33 through which oil is circulated, and an oil scavenge 34 to collect oil from the engine components(s) 33 and return the oil to the oil tank 31. A main oil conduit 35, comprising a plurality of oil tubes, are provided for circulating the oil throughout the oil system 30. It is understood that other components of the oil system 30 may be included, for instance, one or more heat exchangers, filters and deaerators.

The main oil pump 32 is directly driven by a rotor of the engine 10, for instance, a high-pressure or a low-pressure rotor of the turbine 14. As such, in the case of a fire-induced emergency shutdown procedure, it is desirable for the turbine 14 to drive the main oil pump 32 at a sufficient velocity to continue to circulate oil throughout the oil system 30 so that the flowing oil may act as a heat sink and minimize the potential damage caused by the fire. The flow rate of oil to be circulated in the case of a fire-induced emergency shutdown procedure may be modest, as even a relatively low flow rate of oil compared to the flow rate of oil under typical operating conditions is sufficient to distribute heat efficiently. As such, the present disclosure provides an airflow control system for modulating a flow of air towards the air inlet 11 of the aircraft engine to drive the turbine 14 at a sufficient velocity in the case of a fire-induced emergency shutdown procedure.

Figure 3A:
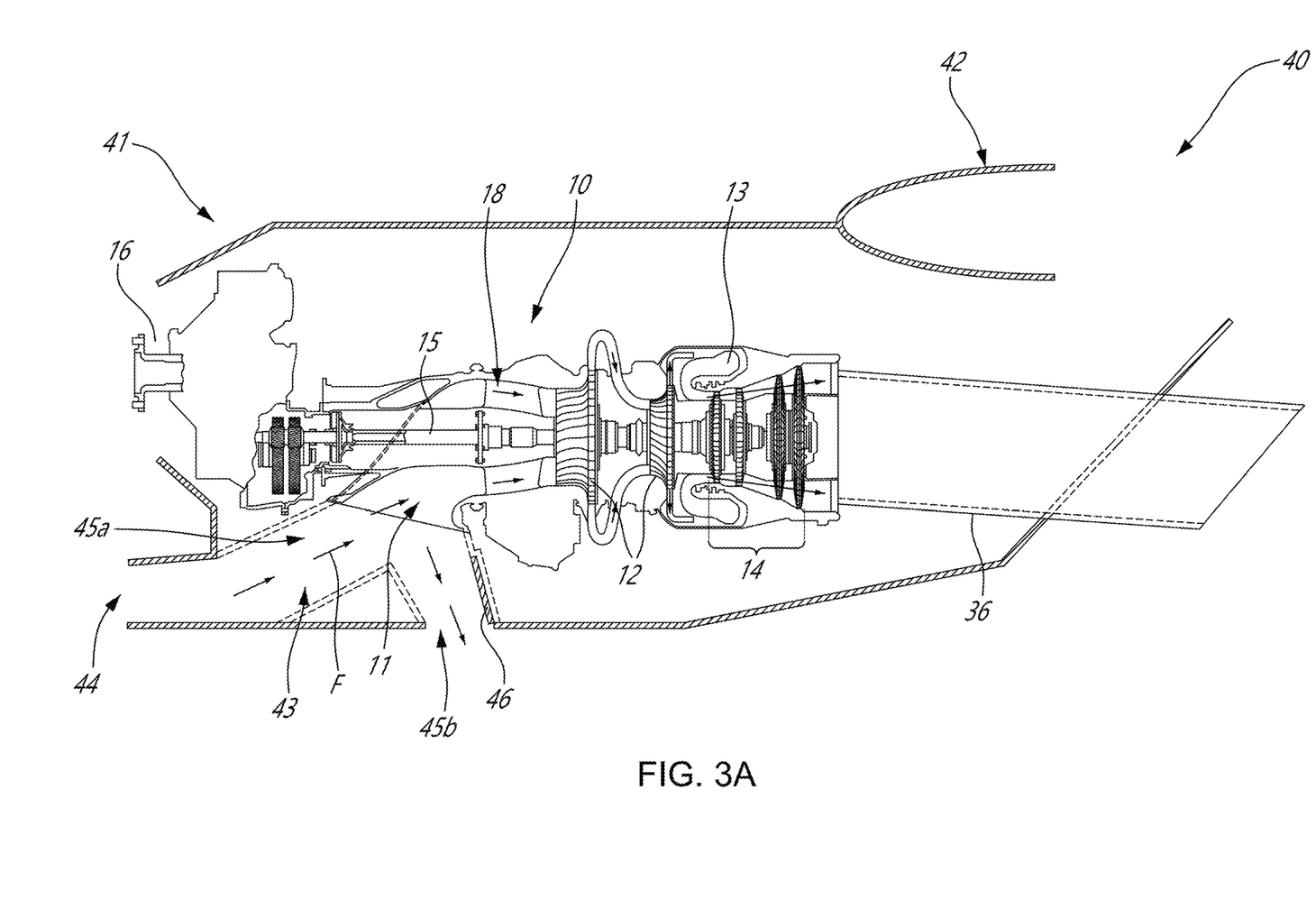
FIG. 3A-3B are schematic cross sectional views of the gas turbine engine of FIG. 1 housed in an aircraft nacelle in various operating conditions.
Figure 3B:
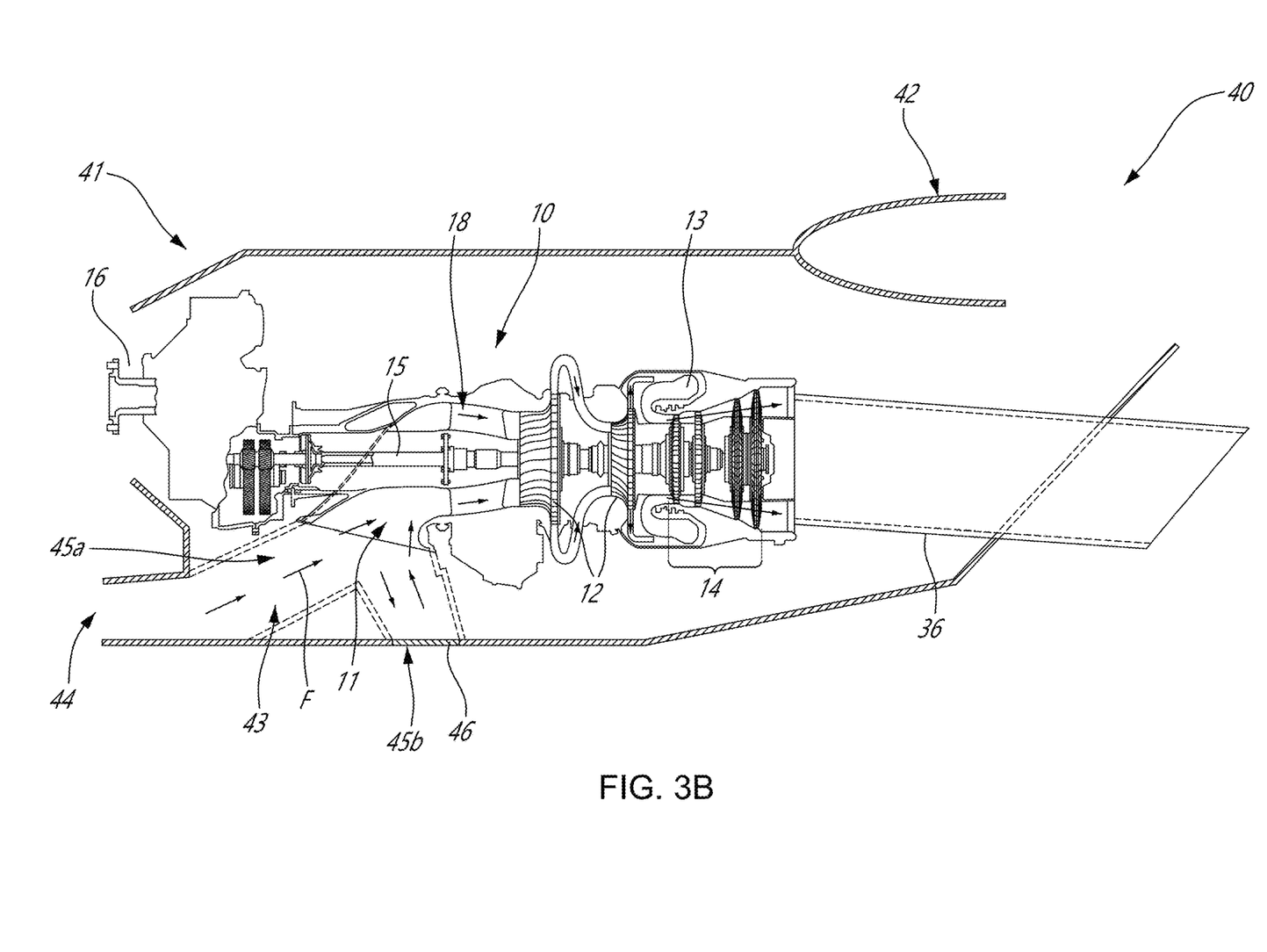

Referring now to FIGS. 3A-3B, there is shown an exemplary depiction of an aircraft 40 with the gas turbine engine 10 in various operating conditions. In particular, FIG. 3A shows the engine 10 in a typical operating condition, while FIG. 3B shows the engine 10 in an emergency shutdown condition or state. The engine 10, as well as an exhaust duct 36, are disposed within a nacelle 41 of the aircraft 40, upstream of a wing leading edge 42 of the aircraft 40. The engine 10 and the nacelle 41 may be collectively referred to as an aircraft engine system. A nacelle bypass duct 43 directs airflow F, for instance generated by way of a rotating propeller, towards the inlet 11 and into the annular gas path 18 of the engine 10. The airflow F can include both ambient air outside the nacelle 41 as well as air driven by a propeller (not shown) mounted to the propeller shaft 16.

The nacelle bypass duct 43 has a bypass duct inlet 44, a first bypass duct outlet 45a opening in fluid communication with the air inlet 11 of the engine 10, and a second bypass duct outlet 45b in fluid communication with an environment external to the nacelle 41 (e.g., the atmosphere). A closure 46 is provided in the nacelle bypass duct 43 at a location in the bypass duct 43 downstream of the first outlet 45a thereof, illustratively adjacent to the second bypass duct outlet 45b. The closure 46 is movable between a first or open position (see FIG. 3A) in which the second bypass duct outlet 45b is fluidly connected to the bypass duct inlet 44, and a second or closed position (see FIG. 3B) in which the second bypass duct outlet 45b is at least partially blocked by the closure 46. Various mounting and biasing arrangements for the closure 46 are contemplated, as discussed in further detail below, and combine to form an airflow control system to modulate the airflow F through the nacelle bypass duct 43.

Referring to FIG. 3A, under normal or typical operating conditions, the closure 46 is disposed in its first or open position. As such, a portion of airflow F flowing through the nacelle bypass duct 43 is directed into the annular gas path 18 of the engine 10 via the first bypass duct outlet 45a and inlet 11, while a remainder of the airflow F flows out of the bypass duct 43 via the second bypass duct outlet 45b. This remainder of the airflow F, also referred to as a bypass flow, can be diverted away from the inlet 11 for a variety of reasons. For instance, the geometry of or flow path through the nacelle bypass duct 43 can be designed to divert large particles away from the inlet 11. Additionally or alternatively, the diverting of the bypass flow can be done to prevent over-pressurization at the inlet 11. Other considerations for bypassing a portion of the airflow F away from the inlet 11 are contemplated.

Referring to FIG. 3B, upon initiation of an emergency shutdown sequence of the engine 10, the closure 46 is biased towards its second or closed position. In this position, a greater volume of the airflow F than a corresponding volume under normal operating conditions is directed into the annular gas path 18 via the inlet 11. As discussed above, in the case of an emergency shutdown sequence, the flow of fuel is cut to the engine 10 which hinders the turbine 14's ability to power the main oil pump 32 and flow oil throughout the engine 10. The airflow F generated by a windmilling propeller may be insufficient to drive the turbine 14 in such a way, as a portion of the airflow F is bypassed. To continue to circulate oil throughout the oil system 30 so that the flowing oil may act as a heat sink and minimizes the potential damage caused by the fire, the closure 46 is biased towards its second or closed position, thereby increasing the flow of air through the annular gas path 18 and driving the turbine 14. It is thus understood that the oil system 30 and above-described airflow control system combine to form a fire-induced shutdown system for the engine 10. In various embodiments, once the closure 46 is biased towards its closed or second position, it is retained in this position until the aircraft is safely grounded.

In some cases, the closure 46 fully closes the flow path through the second bypass duct outlet 45b, thereby ensuring that an entirety of the airflow F enters the inlet 11. In other cases, the closure 46 partially closes the flow path through the second bypass duct outlet 45b, and as such a greater volume of the airflow F than a corresponding volume normal operating conditions (but not the entirety of the airflow F) is directed towards the inlet 11 via the first bypass duct outlet 45a, while a lesser volume of the airflow F than a corresponding volume under normal operating conditions bypasses the inlet 11 and exits the nacelle bypass duct 43 via the second bypass duct outlet 45b.

Figure 4A:
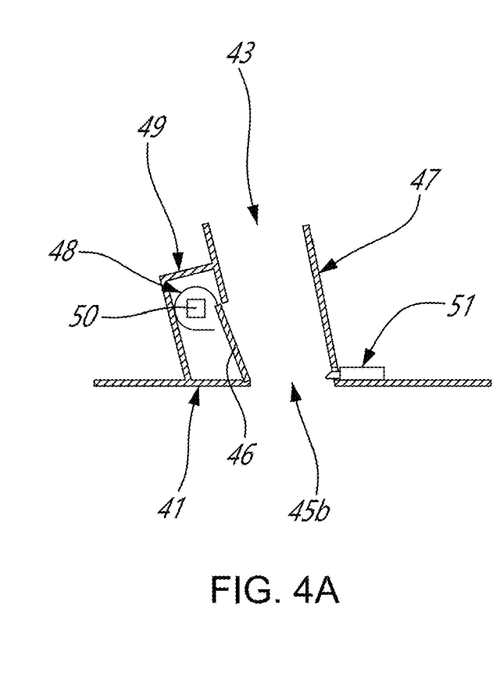
FIGS. 4A-4C are schematic cross sectional views of a closure for a bypass duct of the nacelle of FIGS. 3A-3B in various operating configurations, according to an embodiment.
Figure 4B:
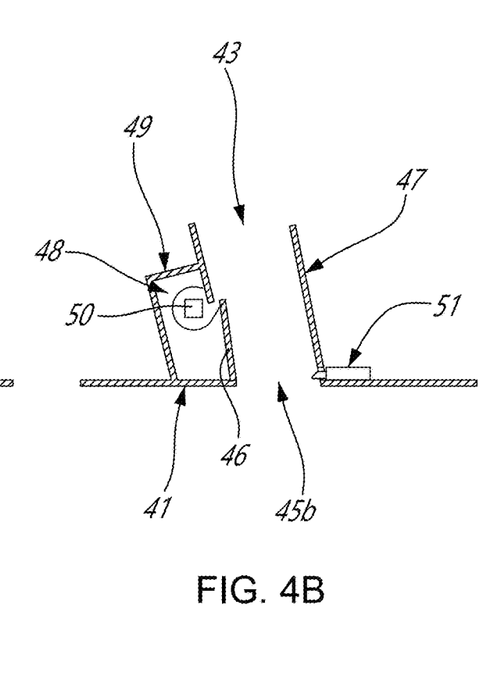
Figure 4C:
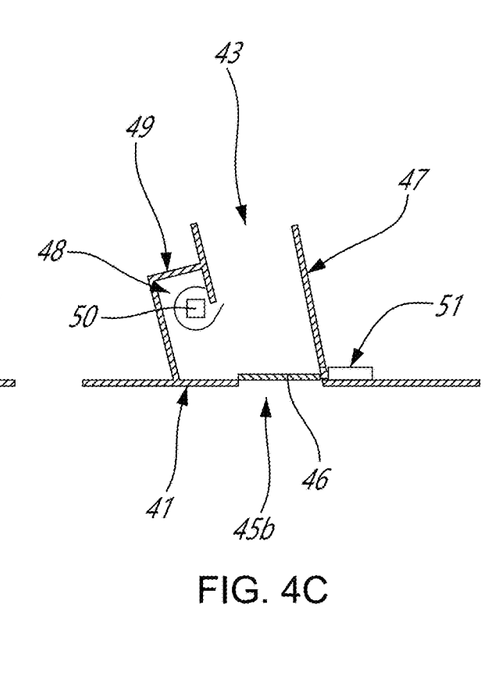

Referring now to FIGS. 4A-4C, an embodiment of a closure 46 in the nacelle bypass duct 43 is shown. In this embodiment, the closure 46 is a flap or plate hingedly mounted to a wall 47 of the nacelle bypass duct 43, adjacent to the second bypass duct outlet 45b. The closure 46 is thus rotatable between the first position (FIG. 4A) and the second position (FIG. 4C). In this embodiment, an actuator, illustratively a locking cam 48 actuated by a servo motor 50 is provided to control the positioning of the closure 46. In particular, under normal operating conditions of the engine 10 (see FIG. 4A), the locking cam 48 is adapted to retain the closure 46 in its first or open position, illustratively within a recess 49 in the bypass duct wall 47. Other actuator types are contemplated. When an emergency shutdown sequence is initiated, the servo motor 50 actuates the locking cam 48 to rotate, thereby releasing the closure 46 from its open position (see FIG. 4B). Once released, the airflow F in the nacelle bypass duct 43 forces the closure 46 to rotate the closure 46 towards the closed position (see FIG. 4C). The actuator can be adapted to provide a biasing force to at least partially rotate the closure 46 towards the closed position. In the shown embodiment, a securing device, illustratively a spring latch 51, is provided at the opposite nacelle wall 47 to retain the closure 46 in its closed or second position, for instance until the aircraft is safely grounded. The closure 46 can, for instance, include a recess at a distal end thereof to engage with the spring latch 51. Other retaining devices are contemplated. In other cases, the closure 46 is retained or secured in its second or closed position due to the force of the airflow F acting against it, and as such the retaining device can be omitted.

Figure 5A:
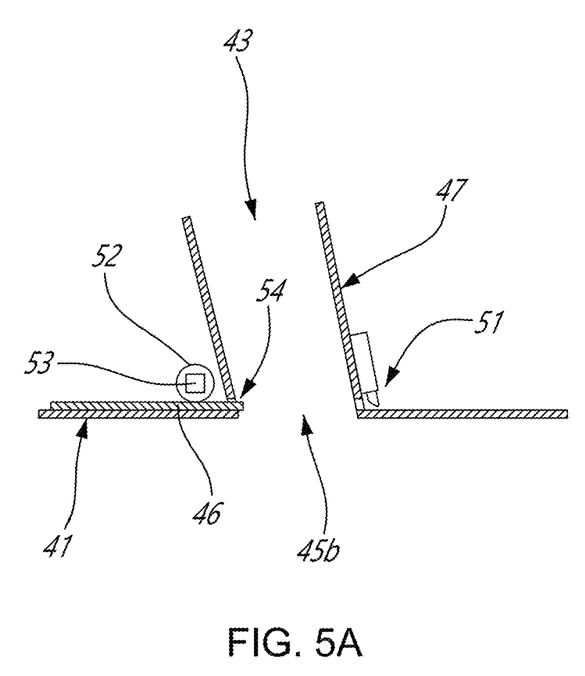
FIGS. 5A-5B are schematic cross sectional views of a closure for the bypass duct of the nacelle of FIGS. 3A-3B in various operating configurations, according to another embodiment.
Figure 5B:
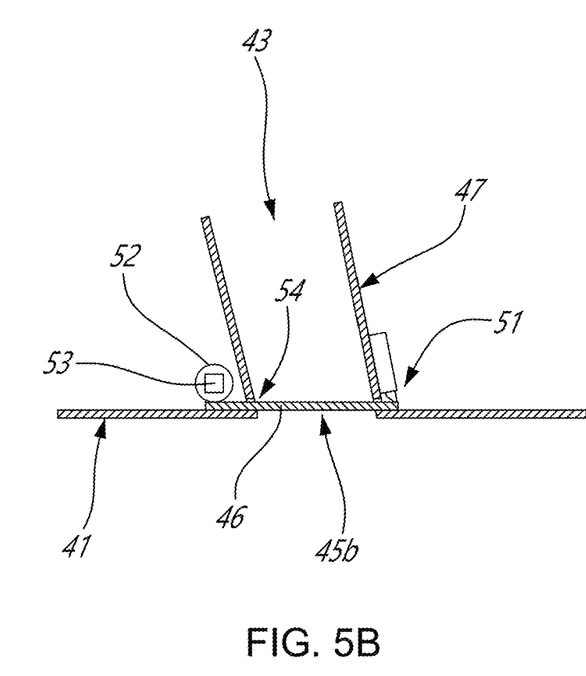

Referring now to FIGS. 5A-5B, another embodiment of a closure 46 in the nacelle bypass duct 43 is shown. In this embodiment, the closure 46 is a flap or plate disposed adjacent to the second bypass outlet duct 45b and slideable in a direction tangential to the second bypass duct outlet 45b between the first position (see FIG. 5A) and the second position (see FIG. 5B). In this embodiment, an actuator, illustratively a drive wheel 52 driven by a servo motor 53, is adapted to impart a translational movement to the closure 46. In other cases, the drive wheel 52 can be replaced with a rack and pinion mechanism. Other actuator types are contemplated. An aperture 54 is illustratively provided through one of a nacelle wall 47, allowing the closure 46 to be removed from the nacelle bypass duct 43 when in the first position (see FIG. 5A). When an emergency shutdown sequence is initiated, the servo motor 53 actuates the drive wheel 52 to displace the closure 46 through the aperture 54 towards the second position (see FIG. 5B), thereby blocking the bypass duct outlet 45. In the shown case, a securing device, illustratively a spring latch 51, is provided at the opposite nacelle wall 47 to retain the closure 46 in the second position, for instance until the aircraft is safely grounded. The closure 46 can, for instance, include a recess at a distal end thereof to engage with the spring latch 51. Other retaining devices are contemplated. In other cases, the retaining device is omitted.

Figure 6A:
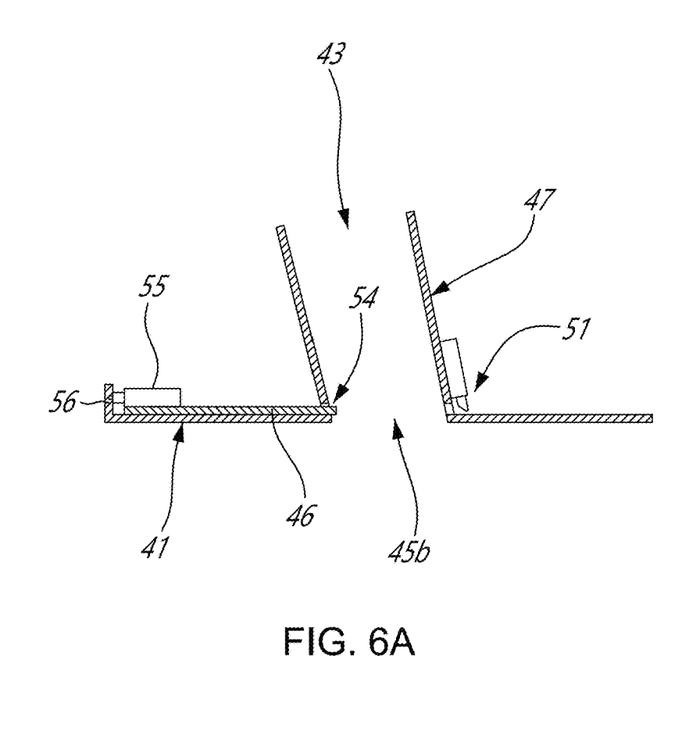
FIGS. 6A-6B are schematic cross sectional views of a closure for the bypass duct of the nacelle of FIGS. 3A-3B in various operating configurations, according to yet another embodiment.
Figure 6B:
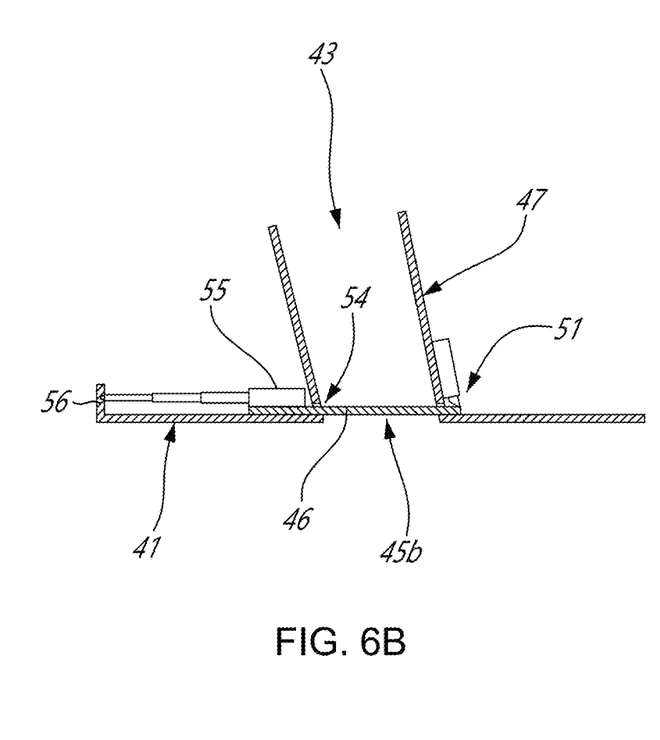

Referring now to FIGS. 6A-6B, another embodiment of a closure 46 in the nacelle bypass duct 43 is shown. As was the case in the embodiment of FIGS. 5A-5B, in this embodiment, the closure 46 is a flap or plate disposed adjacent the second bypass outlet duct 45b and slideable in a direction tangential to the second bypass duct outlet 45b and through an aperture 54 in a nacelle wall 47 between the first position (see FIG. 6A) and the second position (see FIG. 6B). In this embodiment, an actuator, illustratively a spring piston 55 is mounted to the closure 46 and adapted to engage with a static structure 56 on a radially inner surface of the nacelle 41, for instance a wall or ledge. Other actuator types are contemplated. In the first position of the closure 46 (see FIG. 6A), the spring piston 55 is disposed against the static structure 56. When an emergency shutdown sequence is initiated, the spring piston 55 is triggered and pushes against the static structure 56 to effect translational displacement of the closure 46 towards the second position (see FIG. 6B). In the shown case, a securing device, illustratively a spring latch 51, is provided at the opposite nacelle wall 47 to retain the closure 46 in the second position, for instance until the aircraft is safely grounded. The closure 46 can, for instance, include a recess at a distal end thereof to engage with the spring latch 51. Other retaining devices are contemplated. In other cases, the retaining device is omitted.

Figure 7:
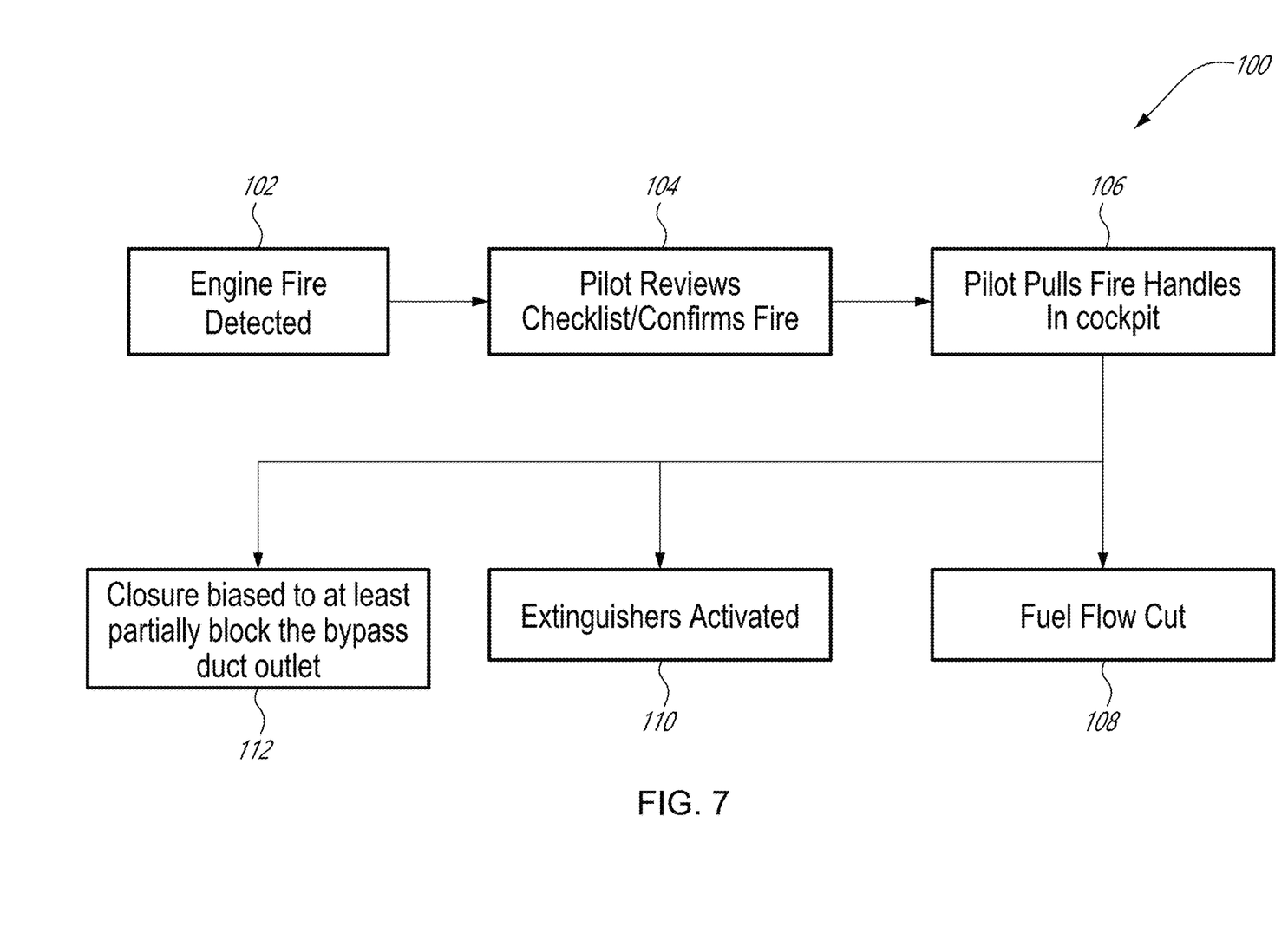
FIG. 7 is a flow chart of an exemplary shutdown procedure due to a fire within the engine of FIG. 1.

Referring to FIG. 7 there is shown at 100 an exemplary emergency shutdown procedure due to a fire within the engine 10, in accordance with an embodiment of the present disclosure. At 102, a pilot receives an indication that a fire within the engine 10 has been detected. At 104, the pilot reviews the appropriate checklist and confirms that a fire is indeed present within the engine 10. At 106, once the fire is confirmed, the pilot engages the emergency shutdown procedure, for instance by pulling a fire handle in the cockpit, which cuts fuel to the engine 10 (at 108) and activates one or more fire extinguishers (at 110). In addition, by way of the shutdown procedure, at 112, the closure 46 is biased, for instance by way of one of the above-described actuators, to at least partially block the second bypass duct outlet 45b to force more airflow F through the inlet 11 and into the core gas path 18. As such, the turbine 14 is driven at a rate sufficient to drive the main oil pump 32. The main oil pump 32 thus circulates oil throughout the engine's oil system 30 that would otherwise be stagnant. The circulating oil acts as a heat sink, thereby limiting the potential damage caused by the fire. In some cases, the actuator is automatically activated once the emergency shutdown procedure is engaged (e.g., in response to the pilot pulling a fire handle in the cockpit). In other cases, the actuator is manually activated by way of an additional activator. In some cases, control of the actuator is carried out by the aircraft bus.

Figure 8:
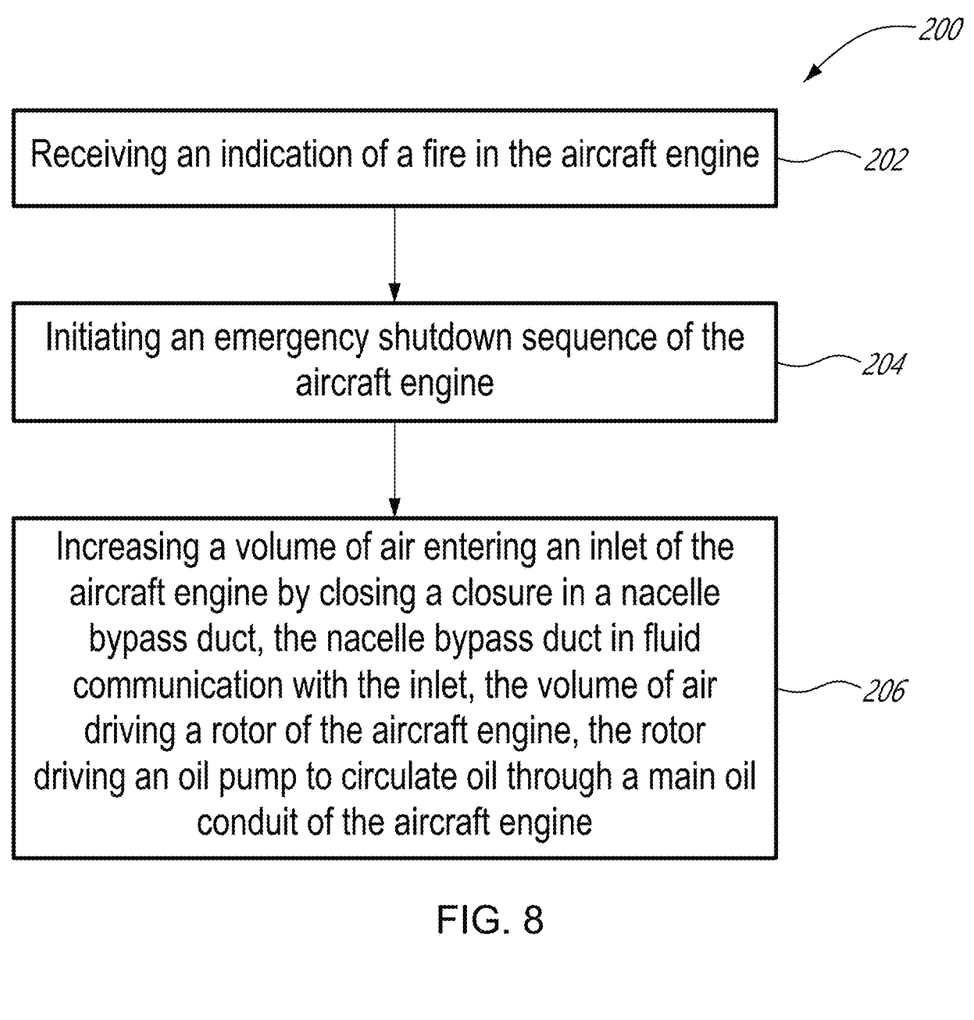
FIG. 8 is a flow chart of an exemplary method for operating an aircraft engine in a fire-induced emergency shutdown state.

Referring to FIG. 8, there is shown at 200 an exemplary method for operating an aircraft engine 10 in a fire-induced emergency shutdown state, according to an embodiment of the present disclosure. At 202, an indication is received of a fire in the aircraft engine 10. At 204, in response to the receiving the indication of the fire in the aircraft engine 10, an emergency shutdown sequence of the aircraft engine 10 is initiated. At 206, in response to the initiating the emergency shutdown sequence of the aircraft engine 10, a volume of air entering an inlet 11 of the aircraft engine 10 is increased by closing a closure 46 in a nacelle bypass duct 43, the nacelle bypass duct 43 in fluid communication with the inlet 11, the volume of air driving a rotor (e.g., turbine 14) of the aircraft engine 10, the rotor driving an oil pump 32 to circulate oil through a main oil conduit 35 of the aircraft engine 10.

In an embodiment, the step of closing the closure 46 in the nacelle bypass duct 43 includes biasing, via an actuator, the closure 46 from a first position in which an outlet 45 of the bypass duct 43 is fluidly connected to an inlet 44 of the bypass duct 43 to a second position in which fluid flow from the inlet 44 of the bypass duct 43 to the outlet 45 of the bypass duct 43 is at least partially blocked by the closure 46.

In an embodiment, the method further comprises, subsequently to the biasing the closure 46 from the first position to the second position, retaining, via a securing device, the closure 46 in the second position.

In an embodiment, the step of biasing the closure 46 from the first position to the second position includes activating a servo motor 50 to rotate a locking cam 48, the locking cam 48 biasing the closure 46 from the first position to the second position.

In an embodiment, the step of biasing the closure 46 from the first position to the second position includes sliding the closure 46 in a direction tangential to the outlet 45 of the bypass duct 43 from the first position to the second position.

In an embodiment, the step of increasing the volume of air entering the inlet 11 of the aircraft engine 10 by closing the closure 46 in the nacelle bypass duct 43 is automatically initiated upon the initiating the emergency shutdown sequence of the aircraft engine 10.

The present disclosure therefore provides for an airflow control system including a closure in a nacelle bypass duct that is biased to at least partially block an outlet of the nacelle bypass duct in case of a fire-induced emergency shutdown procedure to draw more air into the core gas path of the engine, drive the turbine, and thus circulate oil through the engine's oil system, thereby acting as a heat sink and distributing heat from the fire throughout the engine. As such, potential damage and possible leakage of flammable fluids may be avoided.

Advantageously, the engine incorporating this system may utilize lighter and thinner materials, as well as more compact designs, for its various components due to the distribution of heat under fire conditions.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for operating an aircraft engine in a fire-induced emergency state, the aircraft engine housed in a nacelle defining a nacelle bypass duct having a first outlet fluidly connected to an inlet of the aircraft engine and a second outlet fluidly connected to an environment external to the nacelle, the method comprising:
   receiving an indication of a fire of the aircraft engine;
   in response to the receiving the indication of the fire in the aircraft engine, initiating an emergency shutdown sequence of the aircraft engine;
   in response to the initiating the emergency shutdown sequence of the aircraft engine, increasing a volume of air entering the inlet of the aircraft engine by restricting air flow through the second outlet of the nacelle bypass duct;
   using the volume of air entering the inlet of the aircraft engine to drive a rotor of the aircraft engine; and
   using the rotor to drive an oil pump to circulate oil through a main oil conduit of the aircraft engine.

2. The method as defined in claim 1, wherein the restricting air flow through the second outlet includes closing a closure positioned in the nacelle bypass duct at an upstream side of the second outlet, and wherein the method further comprises biasing, via an actuator, the closure from a first position in which the second outlet of the nacelle bypass duct is fluidly connected to an inlet of the nacelle bypass duct to a second position in which fluid flow from the inlet of the nacelle bypass duct to the second outlet of the nacelle bypass duct is at least partially blocked by the closure.

3. The method as defined in claim 2, further comprising, subsequently to the biasing the closure from the first position to the second position, retaining, via a securing device, the closure in the second position.

4. The method as defined in claim 2, wherein the biasing the closure from the first position to the second position includes activating a servo motor to rotate a locking cam, the locking cam biasing the closure from the first position to the second position.

5. The method as defined in claim 2, wherein the biasing the closure from the first position to the second position includes sliding the closure in a direction tangential to the second outlet of the nacelle bypass duct from the first position to the second position.

6. The method as defined in claim 1, wherein the increasing the volume of air entering the inlet of the aircraft engine is automatically initiated upon the initiating the emergency shutdown sequence of the aircraft engine.

* * * * *